Nov. 22, 1949 K. EASTERDAY 2,488,810
AUTOMATIC SHUTTER MECHANISM FOR PITOT TUBES
Filed May 25, 1946
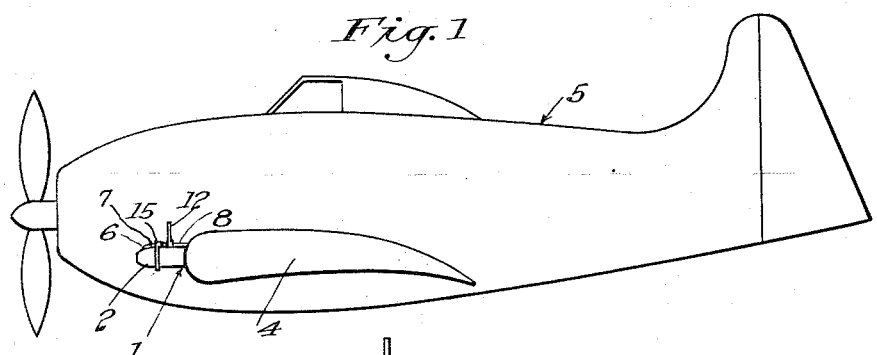
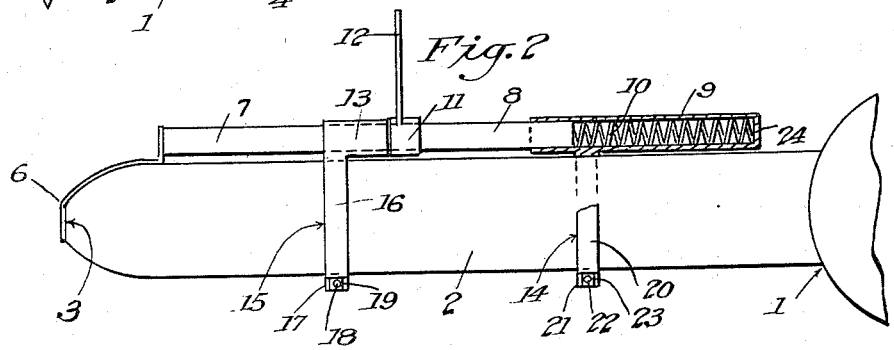
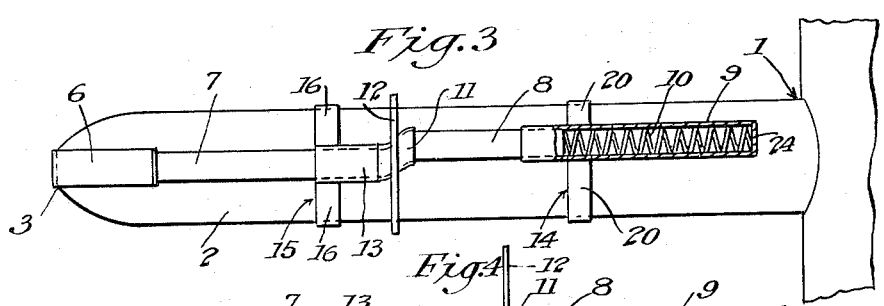
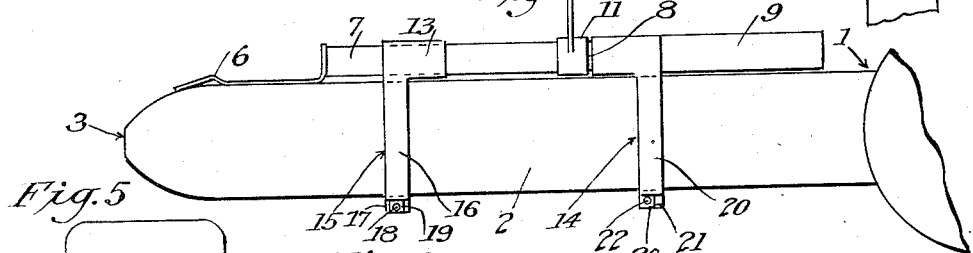
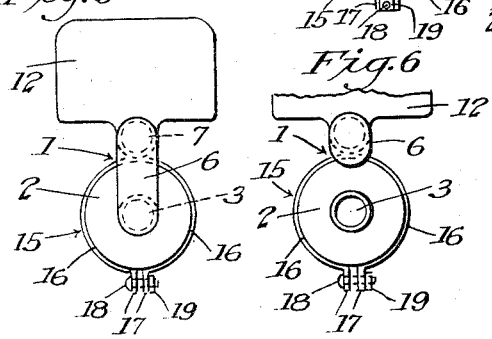
INVENTOR:
Karl Easterday,
BY Alan Franklin,
ATTORNEY.

Patented Nov. 22, 1949

2,488,810

UNITED STATES PATENT OFFICE 2,488,810

AUTOMATIC SHUTTER MECHANISM FOR PITOT TUBES

Karl Easterday, Culver City, Calif.

Application May 25, 1946, Serial No. 672,269

3 Claims. (Cl. 73—182)

This invention relates to air speed measuring and indicating instruments for aircraft, and more particularly to a device for automatically closing, or uncovering the air inlet opening of the Pitot static tube of such an instrument for protecting and operating said instrument as required.

The general object of the invention is to provide a device for automatically closing the air inlet opening of the Pitot static tube of an air speed measuring and indicating instrument on an airplane, when the plane lands on the ground, and for automatically uncovering said opening, as the plane gains speed in taking off from the ground, whereby air and the elements are prevented from entering said tube through said opening and damaging said instrument, while the plane is on the ground, and air is admitted into said Pitot tube to operate said instrument to measure and indicate the wind speed as the plane flies.

Other objects and advantages will appear hereinafter as this specification progresses.

The invention is illustrated in the annexed drawing, which forms a part of this specification, and in which:

Fig. 1 is a side elevation of a wind speed measuring and indicating instrument embodying my invention, shown mounted on a wing of an airplane.

Fig. 2 is a side elevation of a wind-speed measuring and indicating instrument embodying my invention, with my invention shown in position closing the air-inlet opening of the Pitot tube of said instrument.

Fig. 3 is a plan view of Fig. 2.

Fig. 4 is a view like Fig. 2, except that my invention is shown in position uncovering the air-inlet opening of the Pitot tube of the wind-speed measuring and indicating instrument.

Fig. 5 is a front end elevation of Fig. 2.

Fig. 6 is a front end elevation of Fig. 3.

Referring more particularly to the drawing, in which the same parts are designated by the same reference numerals, I designates a wind-speed responsive instrument including a Pitot tube 2 provided with an air-inlet opening 3 in its forward end, which instrument is shown mounted in the forward edge of a wing 4 of an airplane 5 in Fig. 1 of the drawing.

My invention includes generally a shutter 6, a shutter shaft 7, a plunger 8, a plunger tube 9, a plunger spring 10, a shaft and plunger coupling 11, a wind pressure plane 12 upstanding from said coupling, a clamp bearing 13 for said shaft and a mounting clamp 14 for said plunger tube 9. The shutter 6 comprises a flat strip of spring steel shaped to extend forwardly and downwardly over the forward end of the Pitot tube 2 and over the air-inlet opening 3 in said end of said Pitot tube.

The coupling 11 couples the rear end of the shutter shaft 7 and the forward end of the plunger 8 in axially offset relation, as shown in Fig. 3.

The clamp bearing 13 includes a depending clamp 15 comprising a pair of arcuate spring clamp members 16, the end portions 17 of which members are bent outwardly, and through which end portions are extended clamp bolts 18, on the ends of which are threaded nuts 19. The bearing 13 is clamped on the forward portion of the Pitot tube 2, above said tube coaxially therewith by the clamp 15, the members 16 of which clamp are extended downwardly around the sides of said Pitot tube and clamped around said tube by the clamp bolt 18 and nut 19, which are tightened against the lower end portions 17 of said clamp members.

The mounting clamp 14 comprises a pair of depending arcuate spring clamp members 20, the end portions 21 of which are bent outwardly and through which are extended a clamp bolt 22, on the end of which is threaded a nut 23. The plunger tube 9 is clamped by the clamp 14 on the Pitot tube 2 rearwardly of the bearing 13 and clamp 15 and above said Pitot tube, and to one side of the clamp bearing 13, the members 20 of said clamp 14 extending downwardly around the sides of said Pitot tube and being clamped around said tube by the clamp bolt 22 and nut 23, which are tightened against the lower end portions 21 of said clamp members. The offsetting of the plunger 8 to one side of the shutter shaft 7 and the clamping of the plunger tube 9 to one side of the clamp bearing 13 on the Pitot tube 2 to receive said plunger, prevents the shutter shaft 7 from turning in its bearing 13 and thereby maintains the shutter 6 in alignment with the opening 3 in the forward end of the Pitot tube 2 and the pressure plane 12 in an upright position above said tube in operative position.

The plunger spring 10 is located in the plunger tube 9 with its rear end bearing against the closed rear end 24 of said tube and its forward end bearing against the rear end of the plunger 8, which spring urges said plunger, pressure plane 12, shutter shaft 7 and shutter 6 forwardly and normally maintains the forward end of said shutter in position over the opening 3 in the forward end of the Pitot tube 2, closing said opening.

The operation of my invention is as follows:

When the airplane 5 is on the ground the air-inlet opening 3 in the forward end of the Pitot tube 2, is closed by the shutter 6, which is projected forwardly over said opening by the plunger spring 10 through the medium of the plunger 8, coupling 11 and shutter shaft 7.

When the plane 5 gains speed in taking off from the ground the pressure of the air against the pressure plane 12 forces said plane, together with the coupling 11, shaft 7, shutter 6 and plunger 8 rearwardly against the tension of the spring 10, which is compressed by said plunger until said shutter is withdrawn rearwardly, from over the air-inlet opening 3 in the forward end of the Pitot tube 2, uncovering said opening and allowing the air to pass therethrough into said Pitot tube to operate the wind-speed measuring and indicating instrument 1 to measure and indicate the wind speed through which the plane flies.

When the plane lands the pressure of the air against the pressure plane 12 is reduced, so that the spring 10 forces the plunger 8 together with the coupling and pressure plane 12, shaft 7 and shutter 6 forwardly until said shutter is projected over and closes the opening 3 in the forward end of the Pitot tube 2, preventing the air and the elements from entering the Pitot tube through said opening and thereby protecting the wind-speed responsive instrument 1 from the air and the elements.

I claim:

1. In combination with a wind-speed measuring and indicating instrument including a Pitot tube provided with an air-inlet opening in its forward end, a shutter slidably mounted on said Pitot tube, said shutter comprising a flat strip of spring material shaped to extend forwardly and downwardly over the forward end of said Pitot tube and over said inlet opening, a shaft slidably mounted on said Pitot tube and secured at its forward end to the rear end of said shutter, a pressure plane coupled to said shaft to be acted upon by the air during flight of the plane to move said shaft rearwardly to withdraw said shutter from said opening and uncover said opening to permit entrance of air through said opening into said Pitot tube to actuate said instrument, and a spring for projecting said shaft forwardly and thereby projecting said shutter over said opening and closing the same to prevent air from entering said Pitot tube through said opening to protect said instrument from the air and the elements when the plane lands.

2. In combination with a wind-speed measuring and indicating instrument including a Pitot tube provided with an air-inlet opening in its forward end, a clamp bearing clamped on said Pitot tube, a plunger tube clamped on said Pitot tube, a shutter comprising a flat strip of spring metal shaped to extend forwardly and downwardly over the forward end of said Pitot tube and over said air-inlet opening, a shaft slidable in said clamp bearing, to the forward end of which shaft said shutter is rigidly secured at its rear end, a plunger connected to said shaft and slidable in said plunger tube, a spring in said plunger tube for forcing said plunger together with said shaft and said shutter forwardly so that said shutter will cover said air inlet opening in said Pitot tube, and a wind pressure plane mounted on said shaft and said plunger to be acted upon by wind pressure to force said plunger rearwardly against the tension of said spring, together with said shaft and said shutter, until said shutter uncovers said air-inlet opening in said Pitot tube.

3. The combination characterized by claim 2 in which the plunger and plunger tube are offset laterally from said shaft and said bearing to prevent turning of said shaft in said bearing.

KARL EASTERDAY.

REFERENCES CITED

The following references are of record in the file of this patent:

UNITED STATES PATENTS

| Number | Name | Date |
|---|---|---|
| 948,872 | Clark | Feb. 8, 1910 |

FOREIGN PATENTS

| Number | Country | Date |
|---|---|---|
| 499,429 | Great Britain | Jan. 24, 1939 |